United States Patent [19]
Lee

[11] Patent Number: 5,777,457
[45] Date of Patent: Jul. 7, 1998

[54] BATTERY CHARGER FOR CHARGING BATTERIES REQUIRING A CONSTANT CURRENT SOURCE ONLY AND THE CONSTANT CURRENT SOURCE FOLLOWED BY CONSTANT VOLTAGE SOURCE

[75] Inventor: Kyeong-Su Lee, Suwon, Rep. of Korea

[73] Assignee: SamSung Electronics Co., Ltd., Suwon, Rep. of Korea

[21] Appl. No.: 759,226

[22] Filed: Dec. 5, 1996

[30] Foreign Application Priority Data

Dec. 5, 1995 [KR] Rep. of Korea .................. 1995 46781

[51] Int. Cl.⁶ ............................................. H01M 10/46
[52] U.S. Cl. ................................................... 320/137
[58] Field of Search ........................... 320/19, 21, 22, 320/27, 28, 29, 30, 39, 40, 49, 56, 132, 133, 134, 137, 155, 157, 158, 163

[56] References Cited

U.S. PATENT DOCUMENTS

| | | | |
|---|---|---|---|
| 4,710,694 | 12/1987 | Sutphin et al. ........................ | 320/21 |
| 4,843,299 | 6/1989 | Hutchings ......................... | 320/39 X |
| 4,876,495 | 10/1989 | Palanisamy et al. ................ | 320/21 X |
| 5,049,804 | 9/1991 | Hutchings ........................... | 320/20 |
| 5,168,205 | 12/1992 | Kan et al. ............................. | 320/22 |
| 5,175,485 | 12/1992 | Joo ....................................... | 320/32 |
| 5,576,608 | 11/1996 | Nagai et al. .......................... | 320/22 |
| 5,637,981 | 6/1997 | Nagai et al. .......................... | 320/22 |

*Primary Examiner*—Edward Tso
*Attorney, Agent, or Firm*—Robert E. Bushnell, EBq.

[57] ABSTRACT

Disclosed is a battery charger capable of charging a rechargeable battery in accordance with three different types of charge modes. These three charge modes are constant current, constant voltage, and constant current followed by a constant voltage. A microprocessor receives as input signals from a battery indicating the battery type and the battery voltage. The microprocessor automatically outputs control signals which activate certain circuitry depending upon the inputs received from the battery. A regulator outputs a switching voltage that is converted into either a constant current or a constant voltage depending upon the circuitry activated. The circuitry provides feedback to the regulator so that the proper pulse width is output by the regulator depending upon the current or voltage sensed. A voltage comparator compares the terminal voltage of the battery and a divided terminal voltage of the battery to a reference value, and sends the results on to the microprocessor which automatically determines whether or not to complete the recharging process using a constant voltage producing circuit.

8 Claims, 3 Drawing Sheets ized Ser. No. 46781/1995.

BATTERY CHARGER FOR CHARGING BATTERIES REQUIRING A CONSTANT CURRENT SOURCE ONLY AND THE CONSTANT CURRENT SOURCE FOLLOWED BY CONSTANT VOLTAGE SOURCE

This application makes reference to, incorporates the same herein, and claims all benefits accruing under 35 U.S.C. §119 arising from an application for Battery Charger With a Plurality of Charge Modes earlier filed in the Korean Industrial Property Office on 16 Nov., 1995 and there duly assigned Ser. No. 46781/1995.

FIELD OF THE INVENTION

The present invention relates to a battery charger capable of charging a rechargeable battery. More particularly, this is a battery charging apparatus for charging a rechargeable battery in accordance with three different types of charge modes, such as a constant current charging, a constant voltage charging and a constant current/voltage charging.

BACKGROUND OF THE INVENTION

Batteries can be recharged by a number of processes. Some batteries require that a constant current source be used to recharge the battery. Some batteries require that a constant voltage source be used to recharge the battery. Depending on the condition of the battery, some batteries benefit from first applying a constant current source and following it up with a constant voltage source when being recharged.

The notion of having a battery recharger automatically determine which process to apply when recharging the battery is not unheard of. U.S. Pat. Nos. 5,049,804 and 4,843,299 for a Universal Battery Charging System and a Method to Hutchings each disclose a universal battery charging system and method. The universal battery charging system used by Hutchings accommodates to a wide variety of batteries, including batteries that requires constant current source to be recharged, batteries that require constant voltage source to be recharged and batteries that require constant current source followed by a constant voltage source to be recharged. For instance, Hutchings shows the processing by where a constant current source is first applied to the battery and after a certain voltage is achieved across the battery terminal, a constant voltage is then applied to finish recharging the battery. This is followed by a trickle current after the battery has been essentially recharged. Another process is described by where a constant current is first supplied to recharge the battery, followed by a constant voltage to complete the recharging of the battery. Hutchings also discloses a recharging process whereby only a constant current is applied to recharge the battery. The magnitude of the current varies from step to step during the recharging process based on the voltage measured across the terminal of the battery being recharged. Hutchings uses removable memory to tell the microprocessor which recipe to use to recharge the battery. This removable memory tells whether or not a constant voltage or a constant current should be supplied, and it also tells what magnitude should be applied as well as at what threshold voltage should be used to trigger the microprocessor to apply a separate current or voltage during the recharging process of the battery. Hutchings accommodates to many types of batteries including lead-calcium, nickel/zinc, and sealed lead-calcium batteries. A key feature in Hutchings appears to be the removable memory which dictates to the microprocessor what recipe to follow to recharge the battery.

The use of a microprocessor controlled battery recharging circuit is also shown in U.S. Pat. No. 4,710,694 for a Microprocessor Controlled Battery Charger to Sutphin et al. discloses a microprocessor controlled battery recharger. The microprocessor reads or senses both the voltage of the battery to be recharged and the rate of increase of voltage of the battery to be recharged during recharging. Based on these two values, the microprocessor adjusts the current level in recharging the battery. The result is a quick and efficient battery recharger that can accommodate to a wide variety of batteries. Sutphin '694 does not provide for constant voltage recharging or constant current followed by constant voltage recharging modes The notion of recharging a battery by first applying a constant current, and then following up the constant current with a constant voltage can be seen in U.S. Pat. No. 5,175,485 for an Apparatus for Controlling Charging of a Storage Battery to Joo. Joo '485 initially charges a battery by supplying a constant current to the battery pack. After the battery pack reaches a certain predetermined threshold voltage, the recharging circuit is switched so that the battery pack is recharged by a constant voltage supply. Joo '485 uses op-amps, transistors, and voltage dividers to achieve these results. Joo '485 is not capable of accommodating to recharging batteries that require only constant current or constant voltage supplies.

The notion of dynamically changing the recharging process is again demonstrated in U.S. Pat. No. 5,168,205 for a Method and Apparatus for Charging a Battery in High Amp And Automatic Charging Modes to Kan, et al. Kan et al '205 discloses a battery recharging apparatus that applies constant current to the battery in order to recharge the battery. Nevertheless, the current applied to the battery is changed throughout the recharging process based on the voltage sensed across the terminals of the battery being recharged. Thus, as a battery recharging process occurs, the voltage across the battery terminal is measured continuously and is compared to a threshold voltage level. If the voltage measured across the battery terminals falls below the threshold value, then a first constant current is applied to recharge the battery. If the voltage across the terminals exceeds the threshold reference voltage, then a second constant current is applied to the battery different from the first constant current value. When the recharger is virtually finished recharging the battery, a third constant current is applied to the battery. This third current source is a trickle supply which is applied when the recharging of the battery is essentially completed. Thus, Kan, et al. '205 applies a different constant current to the battery depending upon the voltage across the battery terminals. Voltage sensed from the battery is compared to a threshold reference voltage to determine what magnitude of current should be used during the recharging process.

What is needed is a recharging circuit that can automatically determine which process to employ when recharging a battery. Input signals provided by the battery to the recharging circuit are used to communicate to the circuit how the battery is to be recharged.

SUMMARY OF THE INVENTION

It is therefore an object of the present invention to provide a battery charger which is capable of automatically charging several different types of rechargeable batteries in a plurality of charge modes.

It is also an object of the present invention to receive input signals from the battery to be recharged, and, based on those input signals, recharge the battery by using either a constant current source, a constant voltage source, or a constant current source followed by a constant voltage source.

These and other objects may be achieved by providing a circuit made up of a controller, a regulator, a voltage comparator, a sub circuit for delivering a constant current to a battery, and a sub circuit for delivering a constant voltage to a battery. Specifically, the controller together with the voltage comparator sense the type of battery to be recharged as well as the terminal voltage of the battery to be recharged. Based on these inputs to the controller, the controller outputs control signals which activate either the constant current subcircuit or the constant voltage subcircuit. With these mechanisms in place, the recharging circuit can recharge a wide variety of batteries automatically. A regulator is used in conjunction with the subcircuits to generate the recharging voltage or current. The regulator outputs a pulse whose width can be adjusted according to the feedback the regulator receives from the subcircuits. The subcircuits, in turn, convert the pulse width to either a constant voltage or a constant current and deliver this constant voltage or constant current to the battery being recharged.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Rechargeable batteries may be charged with a specific charge mode on the basis of their characteristics. Many battery rechargers are capable of charging a rechargeable battery in just one mode. Of the charge modes, a constant current charge mode is provided in a battery recharger usable to quickly charge a specific rechargeable battery. An example of a constant current battery recharging circuit is shown in FIG. 1.

Figure 1:
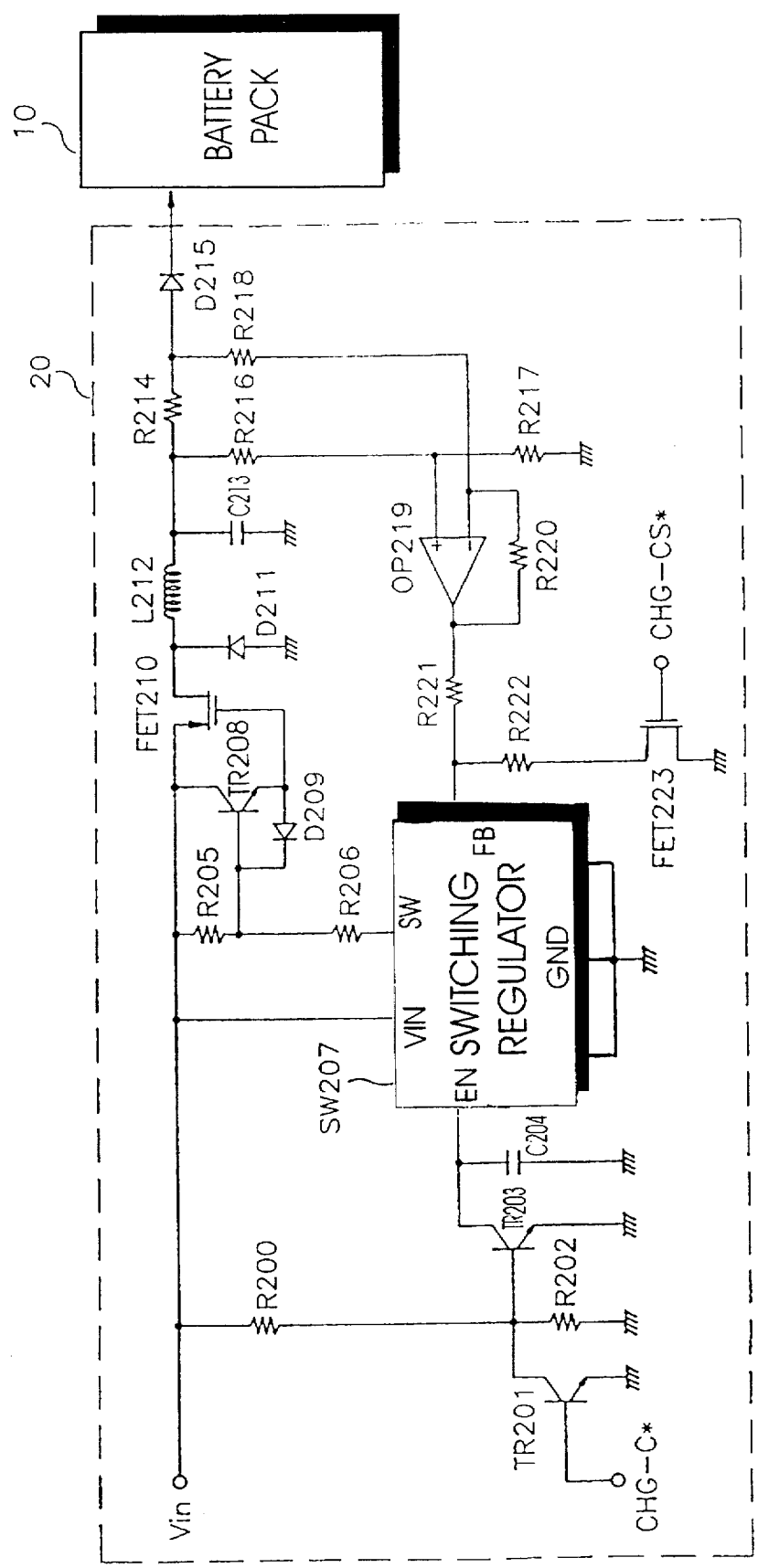
FIG. 1 is a circuit diagram of an earlier battery charger to which a constant current charging mode is applied.

Referring to FIG. 1, the battery recharger charges a battery pack 10 with a constant current charge mode, and is broadly constituted by a switching regulator SW207 which is enabled by a charge control signal CHG-C* to generate a switching signal, a switching device FET210 which is turned on and off in response to the switching signal to provide a charging voltage, a filter for rectifying the charging voltage to eliminate noises contained in the charging voltage and to provide a constant charging current, a current detecting resistor R214 for detecting the amount of a current to be supplied to battery pack 10, and a charge control section for generating a feedback voltage in accordance with the amount of detected current and providing the feedback voltage to a feedback terminal of switching regulator SW207. The regulator generates the switching signal having a varying pulse width in accordance with the feedback voltage. The earlier battery charger further has a switching device FET223 which is turned on and off in response to another charge control signal CHG-CS* to provide a quick charge control signal to the feedback terminal of the switching regulator. The charge control signals CHG-C* and CHG-CS* are applied from a charge controller (not shown) and the switching devices FET210 and FET223 are field effect transistors.

If the charge control signal CHG-C* is at a high level, transistor TR201 is turned on and transistor TR203 is turned off, so that a high level signal is applied to the enable terminal EN of regulator SW207. Then, the regulator SW207 operates and generates a switching signal through an output terminal SW thereof The switching device FET210 is repeatedly turned on and off to generate a charging voltage. The charging voltage is applied to the current detecting resistor R214 through an inductor L212. One end of the inductor L212 is connected to the cathode end of a diode D211 whose anode end is grounded. The other end of the inductor L212 is connected to one end of a capacitor C213, whose other end is grounded. Noises generated by switching device FET210 being turned on and off may be eliminated from the charging voltage by inductor L212, diode D211, and capacitor C213. As a result, a constant current is provided through diode D215 to battery pack 10, and thereby may charge battery pack 10 in a standard charge mode.

Also, since both ends of the current detecting resistor R214 are coupled to noninverting and inverting terminals respectively of an operational amplifier OP219, the operational amplifier OP219 produces a changed feedback voltage corresponding to the amount of current flowing through the resistor R214. Thus, the regulator SW207 generates a varied switching signal in accordance with the changed feedback voltage, so that the battery pack 10 can be properly charged by a constant current in response to the varied switching signal.

On the other hand, so as to quickly charge the battery pack 10, the charge control signal CHG-CS* must be set at high level. Then, the switching device FET223 is turned on, so that the feedback voltage from the operational amplifier OP219 is divided by two resistors R221 and R222 coupled in series to each other. The divided voltage is applied to the feedback terminal FB of regulator SW207, and thus a high frequency switching signal is generated from the regulator SW207. Accordingly, the battery charger may quickly charge the battery pack 10. However, since the earlier battery charger may charge a battery pack only in a constant current charge mode, it cannot be used to recharge a rechargeable battery which requires a constant voltage source for recharging.

Figure 2:
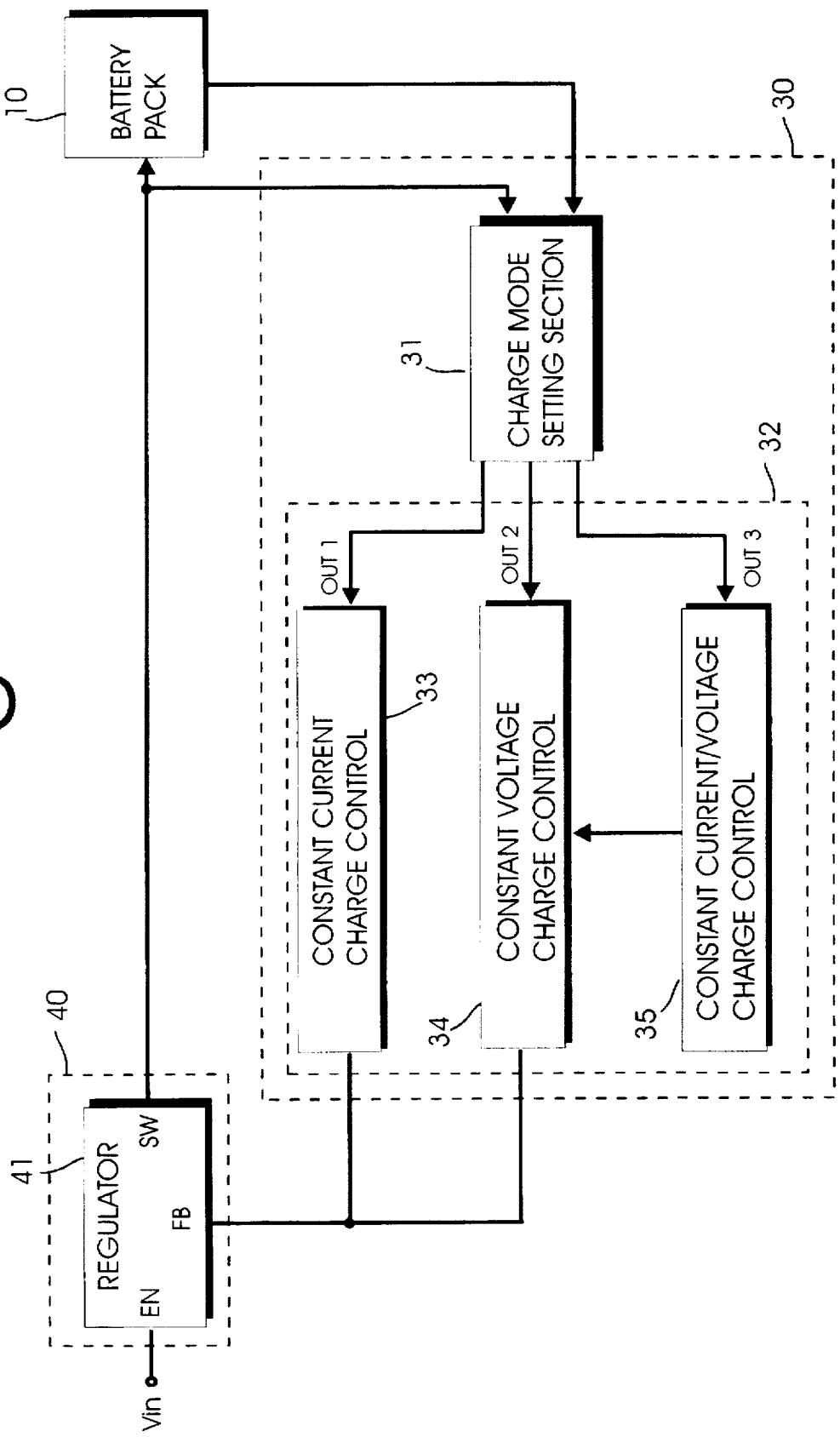
FIG. 2 is a block diagram of a novel battery charger to which a plurality of charge modes are applied.

FIG. 2 illustrates an example of a novel battery charger with which a preferred embodiment of the invention may be implemented. Reference numeral 40 is a charging circuitry which has a switching regulator 41 having the same function as regulator SW207 of FIG. 1. Switching regulator 41 has a feedback terminal FB for receiving a feedback voltage and an output terminal SW for generating a switching signal in response to the feedback voltage. As a switching device (not shown) is turned on and off, a charging current or a charging voltage is generated to charge battery pack 10. In FIG. 2, the charging circuitry 40 has additional circuit components (not shown) in addition to the regulator 41, but the additional circuit components are omitted in FIG. 2 for purposes of clarity. Also, a battery sensing signal is generated from the battery pack 10 and voltage level thereof is determined in accordance with several different types of rechargeable battery packs. If a rechargeable battery pack, which may be charged in a constant current charge mode or a constant current followed by a constant voltage charge mode, is placed in the battery charger, the battery sensing signal of a low level is generated from the battery pack 10. If a battery pack, which may be charged in a constant voltage charge mode, is placed in the battery charger, the battery sensing signal of a high level is generated from the battery pack 10.

The battery charger further comprises a charge mode setting section 31 for setting charge modes in response to the battery sensing signal and a battery voltage to generate charge control signals OUT1, OUT2 and OUT3, and charge control sections 33, 34 and 35 for receiving the charge control signals and generating feedback voltages corresponding to respective charge modes. The charge control section 33 is a constant current charge control section for generating a first feedback voltage, which allows the charging circuitry 40 to charge the battery pack 10 in a constant current mode. The charge control section 34 is a constant voltage charge control section for generating a second feedback voltage, which allows the charging circuitry 40 to charge the battery pack 10 in a constant voltage charge mode. Also, the charge control section 35 is a constant current charge control followed by a constant voltage charge control section for generating a control signal, which allows the second feedback voltage to be generated from the constant voltage charge control section 34 only when a battery voltage is over a predetermined voltage. More particularly, the section 35 may charge the battery pack 10 in a constant current followed by a constant voltage charge mode by having battery pack 10 is firstly charged in the constant current charge mode by means of the constant current charge control section 33 and finally charged in the constant voltage charge mode by means of the constant current charge control section 34 only when a charged voltage of the battery is over a predetermined voltage.

Figure 3:
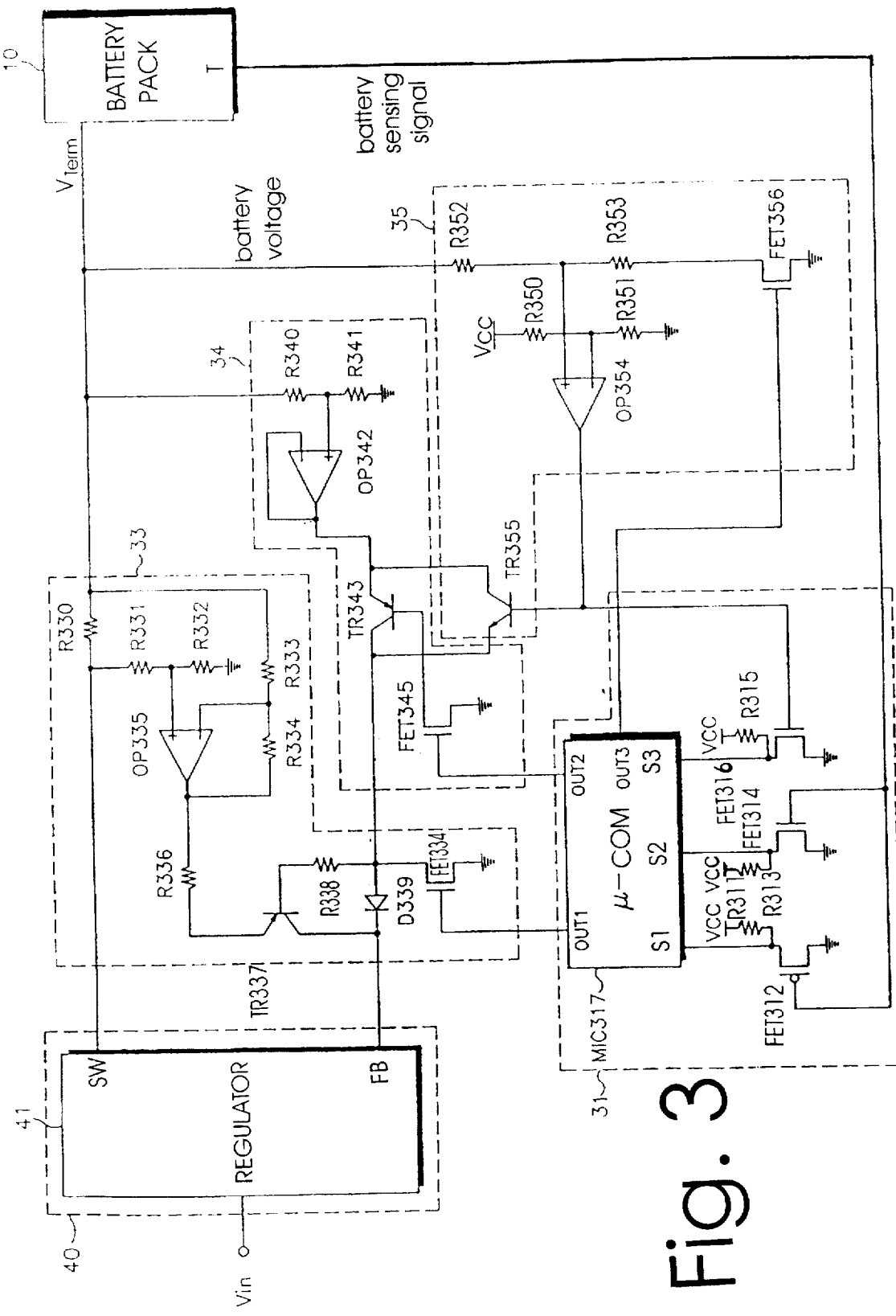
FIG. 3 is a detailed circuit diagram of the novel battery charger shown in FIG. 2.

FIG. 3 is a detailed circuit diagram of the battery charger shown in FIG. 2. The switching regulator 41 generates a switching signal so as to produce a constant voltage by means of a switching device (not shown) to be turned on and off in response a switching signal. The constant voltage is applied through a current detecting resistor R330 to the battery pack 10. Both ends of the current detecting resistor R330 are respectively coupled through resistors to a non-inverting and an inverting terminal of an operational amplifier OP335 respectively in the constant current charge control section 33. A charging voltage at one end of the current detecting resistor R330 is divided by two resistors R331 and R332 and applied to the non-inverting terminal of the amplifier OP335. The other end of the current detecting resistor R330 is coupled through a resistor R333 to the inverting terminal of the amplifier OP335. Between the inverting terminal and an output terminal of the amplifier OP335, a resistor R334 is connected. The output of the amplifier OP335 is supplied through a transistor TR337 to a feedback terminal FB of the regulator 41. The transistor TR337 is turned on and off in accordance with to an output signal OUT 1 of a microcomputer MIC317 which is programmed to selectively generate mode control signals in response to the battery voltage and the battery sensing signal.

The microcomputer MIC317 has three input ports S1, S2 and S3. When the battery sensing signal is at low level, a field effect transistor FET312 is turned on, allowing a voltage at the input port S1 to be lowered to low level. When the battery sensing signal is at high level, a field effect transistor FET 314 is turned on, allowing a voltage at the input port S2 to be lowered to low level. Also, when a battery voltage, i.e., a charged voltage of the battery pack 10, is above a predetermined voltage, a field effect transistor FET316 is turned on, allowing a voltage of the input port S3 to be lowered to low level. Thus, the microcomputer MIC317 outputs charge control signals through output ports OUT1, OUT2 and OUT3 thereof based on input control signals received at input ports S1, S2, and S3. The charge control signal from the output port OUT 1 is used to allow a field effect transistor FET334 to be switched. When the output port OUT1 is at high level, the constant current charge control section 33 is then operated to detect a charging current by means of the current detecting resistor R330 and the operational amplifier OP335 and provide a feedback voltage corresponding to the detected charging current to the regulator 41.

The charge control signal from the output port OUT2 of the microcomputer is used to allow a field effect transistor FET345 to be switched. When the output port OUT2 is at high level, the constant voltage charge control section 34 is then operated to detect a battery voltage by means of an operational amplifier OP342 serving as a buffer circuit. The battery voltage as a feedback voltage is applied to the regulator 41 through a transistor TR343. If the field effect transistor FET345 is turned on, the transistor TR343 is also turned on. The operational amplifier OP342 has an inverting terminal connected to an output thereof and a non-inverting terminal connected between two resistors R340 and R341 for dividing the battery voltage.

In this example, the charge control signal from the output port OUT3 of the microcomputer is used to allow a field effect transistor FET356 to be switched. When the output port OUT3 is at high level, the voltage comparator section 35 is then operated by turning on the transistor FET356, so that a battery voltage is divided by two resistors R352 and R353 to be applied to a non-inverting terminal of an operational amplifier OP354 serving as a comparator. A power source voltage Vcc is divided by two resistors R350 and R351 and the divided voltage as a reference voltage is applied to an inverting terminal of the comparator OP354. If the battery voltage (e.g., a divided voltage by the resistors R352 and R353) is above the reference voltage (e.g. Vcc divided by resistors R350 and R351), the field effect transistor FET316 is turned on, allowing a voltage of the input port S3 to be lowered to low level. At the same time, a transistor TR355 in the constant voltage charge control section 34 is also turned on, allowing the output voltage of the buffer OP342 to be fed to the feedback terminal FB of regulator 41 through transistor TR343.

Hereinafter, the operation of the novel battery charger will be described in detailed with reference to FIG. 3. If a battery sensing signal from the battery pack 10 is at low level so as to charge the battery pack 10 in a constant current charge mode, the field effect transistor FET312 is turned on, but the field effect transistor FET314 off. Since the microcomputer MIC317 then receives low level and high level signals through the input ports S1 and S2, respectively, it determines that the battery pack 10 should be charged in a constant current charge mode. Then, the microcomputer outputs a high level signal through the output port OUT1 and OUT3, but low level signals through output port OUT2 (see Table 1). By the high level signal from the output port OUT1, the field effect transistor FET334 is turned on and then the transistor TR337 is also turned on. Thus, the charging voltage detected by the current detecting resistor R330 is applied via the amplifier OP335 and the transistor TR337 is turned on, thus providing feedback to the feedback terminal of the regulator 41. Meanwhile, the high level output signal from output port OUT3 switches on FET356, enabling the voltage comparator circuit to compare the divided terminal voltage of the battery pack 10 to the reference voltage. $V_{term}$ is divided between resistors R352 and R353, and the result is compared to the reference voltage $V_{ref}$ represented by power supply voltage Vcc divided between resistors R350 and R351. So long as $V_{term}$ remains less than $V_{ref}$, the battery charger allows the charging circuitry 40 to charge the battery pack 10 in the constant current charge mode or first mode of recharging.

If a battery sensing signal from the battery pack 10 is at high level so as to charge the battery pack 10 in a constant voltage charge mode, the field effect transistor FET314 is turned on while the field effect transistor FET312 is turned off. Since the microcomputer MIC317 then receives high level and low level signals through the input ports S1 and S2, respectively, it determines that the battery pack 10 should be charged in a constant voltage charge mode. Then, the microcomputer outputs a high level signal through the output port OUT2 only, but low level signals through the other ports OUT1 and OUT3 (see Table 1). By the high level signal from the output port OUT2, the field effect transistor FET345 is turned on and then the transistor TR343 is also turned on. Thus, the terminal voltage $V_{term}$ voltage is divided by resistors R340 and R341 and the divided voltage is applied via OP342 and transistor TR343 to the feedback terminal FB of the regulator 41. Accordingly, the battery charger allows the charging circuitry 40 to charge the battery pack 10 in the constant voltage charge mode.

In addition, so as to charge a in a constant current followed by a constant voltage charge mode, the process begins as in the first charging mode of operation where battery sensing signal from the battery pack 10 is at a low level and the divided $V_{term}$ is less than the reference voltage set by the voltage dividing resistors R350 and R352. If so, the battery pack 10 continues to be charged as in the above constant current charge mode until the divided $V_{term}$ battery voltage is more than the reference voltage $V_{ref}$. Battery sensing signal is at low level, the field effect transistor FET312 is turned on, but the field effect transistor FET314 off. Also since the battery voltage is less than the reference voltage, the comparator OP354 outputs a low level signal, thereby allowing the field effect transistor FET316 and the transistor TR355 to be simultaneously turned off At this state, the microcomputer MIC317 outputs a high level signal through the output ports OUT1 and OUT3 as with the first charging mode, causing the constant current charging circuit and field effect transistor FET356 to be turned on. See Table 1. This means that the battery pack 10 continues to be charged in the constant current charge mode and the divided $V_{term}$ can be monitored during the constant current recharging process. If the divided $V_{term}$ exceeds the reference voltage during the charging operation, the comparator OP354 outputs a high level signal, thereby allowing the transistor FET316 to be turned on and input signal S3 changed from high to low. Then, the microcomputer MIC317 determines that the battery pack 10 should be charged in a constant voltage charge mode and outputs a low level signal through the output ports OUT1 and OUT3 to cease the constant current charging operation and, at the same time, output a high level signal through the output port OUT2 to start the current voltage charging operation (see Table 1).

From this time, the battery pack 10 is charged in the constant voltage charge mode. Namely, by the high level signal from the output port OUT2, the transistor FET345 is turned on and then the transistor TR343 is also turned on. Thus, the charging voltage as a feedback voltage is applied via OP342 and transistor TR343 to feedback terminal FB of the regulator 41. Accordingly, the battery charger allows the charging circuitry 40 to charge the battery pack 10 in the constant voltage charge mode only when the divided battery terminal voltage is above the reference voltage set by the resistors R350 and R351. Thus, in case of a constant current followed by a constant voltage charge mode, the battery charger allows the battery pack to be firstly charged in the constant current charge mode and to be finally charged in the constant voltage charge mode only when the divided terminal voltage from the recharging battery is over a predetermined voltage.

A battery charger according to the present invention is capable of charging several different types of rechargeable batteries in a plurality of charge modes. Namely, the battery charger is capable of charging a rechargeable battery in each of a constant current and a constant voltage charge modes, or in a constant current/voltage charge mode that the battery is firstly charged in the constant current charge mode and finally charged in the constant voltage charge mode only when a charged voltage of the battery is over a predetermined voltage.

TABLE 1

| | battery sensing | input parts of microprocessor | | | | | | when battery voltage is greater than a |
|---|---|---|---|---|---|---|---|---|
| | signal | S1 | S2 | S3 | OUT1 | OUT2 | OUT3 | reference voltage |
| first mode | low | low | high | high | high | low | high | low |
| second mode | high | high | low | high | low | high | low | low |
| third mode | low | low | high | low | high | low | high | high |

What is claimed is:

1. A universal battery recharging circuit, comprising:

a constant current recharging circuit;

a constant voltage recharging circuit;

a voltage supply;

an input terminal for receiving a battery voltage;

a voltage comparative circuit having an output signal;

a controller; and a regulator, wherein said universal battery recharging circuit can recharge batteries requiring a constant current for recharging, a constant voltage for recharging, or a constant current followed by a constant voltage for recharging, said constant current recharging circuit and said constant voltage recharging circuit both providing feedback to said regulator, said controller having as input signals a battery sensing signal and said output signal from said voltage comparative circuit, and having as output signals a first output signal, a second output signal, and a third output signal, said first output signal activating said constant current recharging circuit, said second output signal activating said constant voltage recharging circuit, said third output circuit activating said voltage comparative circuit.

2. The universal battery recharging circuit of claim 1, said regulator comprising:
  an input voltage terminal;
  an input feedback terminal; and
  an output terminal that outputs switching pulse widths of varying widths to said recharging circuit.

3. The universal battery recharging circuit of claim 2, said controller comprising:
  a microprocessor having a first output terminal, a second output terminal and a third output terminal, a first input terminal, a second input terminal, and a third input terminal;
  a first field effect transistor (FET) having a gate terminal, a source terminal and a drain terminal, said source terminal connected to said first input terminal of said microprocessor, said drain terminal connected to ground;
  an inverter having an input and an output, said output terminal connected to said gate terminal of said first FET;
  a first resistor having a first terminal and a second terminal, said first terminal connected to said power supply and said second terminal connected to said source terminal of said first FET;
  a second FET having a gate terminal, a source terminal, and a drain terminal, said source terminal connected to said second input terminal of said microprocessor, said drain terminal connected to ground, said gate terminal connected to said battery sensing signal;
  a second resistor having a first terminal and a second terminal, said first terminal connected to said power supply and said second terminal connected to said source terminal of said second FET;
  a third FET having a gate terminal, a source terminal, and a drain terminal said source terminal connected to said third input terminal of said microprocessor, said drain terminal connected to ground; and
  a third resistor having a first terminal and a second terminal, said first terminal connected to said power supply and said second terminal connected to said source terminal of said third FET.

4. The universal battery recharging circuit of claim 3, said constant current charging circuit comprising:
  a current sensing resistor having a first terminal and a second terminal, said first terminal connected to said output terminal of said regulator;
  an operational amplifier having an output terminal, an inverting input terminal, and a non-inverting input terminal;
  a second resistor having a first terminal and a second terminal, said first terminal connected to said non-inverting input of said operational amplifier, said second terminal connected to ground;
  a third resistor having a first terminal and a second terminal, said first terminal connected to said first terminal of said current sensing resistor, said second terminal connected to non-inverting input of said operational amplifier;
  a fourth resistor having a first terminal and a second terminal, said first terminal connected to said second terminal of said current sensing resistor, said second terminal connected to said inventing input of said operational amplifier;
  a fifth resistor having a first terminal and a second terminal, said first terminal connected to said output of said operational amplifier, said second terminal connected to said inverting input of said operational amplifier;
  a bipolar transistor having a base terminal, an emitter terminal, and a collector terminal, said collector terminal connected to said feedback terminal of said regulator;
  a sixth resistor having a first terminal and a second terminal, said first terminal connected to said output of said operational amplifier, said second terminal connected to said emitter terminal of said bipolar transistor;
  a diode having a cathode and an anode, said cathode connected to said collector of said bipolar transistor;
  a seventh resistor having a first terminal and a second terminal, said first terminal connected to said base terminal of said bipolar transistor, said second terminal connected to said anode of said diode; and
  a field effect transistor having a gate terminal, a source terminal, and a drain terminal said source terminal connected to said anode of said diode, said drain connected to ground, and said gate terminal connected to said first output terminal of said microprocessor.

5. The universal battery recharging circuit of claim 4, said constant voltage recharging circuit comprising:
  an operational amplifier having an output terminal, an inverting input terminal, and a non-inverting input terminal, said inverting input terminal connected to said output terminal;
  a first resistor having a first terminal and a second terminal, said first terminal connected to said second terminal of said current sensing resistor, said second terminal connected to said non-inverting terminal of said operational amplifier;
  a second resistor having a first terminal and a second terminal, said first terminal connected to said non-inverting terminal of said operational amplifier, said second terminal connected to ground;
  a bipolar transistor having an emitter terminal, a collector terminal, and a base terminal, said emitter terminal connected to said output terminal of said operational amplifier, said collector terminal connected to said anode terminal of said diode of said constant current charging circuit; and
  a field effect transistor having a drain terminal, a source terminal, and a gate terminal, said drain terminal connected to ground, said source terminal connected to said base terminal of said bipolar transistor, and said gate terminal connected to said second output terminal of said microprocessor of said controller.

6. The universal battery recharging circuit of claim 5, said voltage comparator circuit comprising:
  a field effect transistor having a drain terminal, a source terminal, and a gate terminal, said gate terminal connected to said third output terminal of said microprocessor of said controller, said drain terminal connected to ground;

an operational amplifier having an output terminal, an inverting input terminal, and a non-inverting input terminal, said output terminal connected to said gate terminal of said third FET of said controller;

a first resistor having a first terminal and a second terminal, said first terminal connected to said second terminal of said current sensing resistor, said second terminal connected to said non-inverting input of said operational amplifier;

a second resistor having a first terminal and a second terminal, said first terminal connected to said non-inverting terminal of said operational amplifier, said second terminal connected to said source terminal of said field effect transistor;

a third resistor having a first terminal and a second terminal, said first terminal connected to ground, said second terminal connected to said inverting input terminal of said operational amplifier;

a fourth resistor having a first terminal and a second terminal, said first terminal connected to said inverting input terminal of said operational amplifier, said second terminal connected to said power supply; and a bipolar transistor having a base terminal, an emitter terminal and a collector terminal, said base terminal connected to said output terminal of said operational amplifier, said emitter terminal connected to said anode of said diode of said constant current charging circuit and said collector connected to said output of said operational amplifier of said constant voltage recharging circuit.

7. The universal battery recharging circuit of claim 6, said voltage comparative circuit comparing a divided terminal voltage signal from said input terminal for receiving a battery voltage to a divided reference voltage from said power supply.

8. The universal battery recharging circuit of claim 7, said first output signal being always equal to said third output signal and opposite to said second output signal.

* * * * *